US012296666B2

(12) United States Patent
Tanizawa et al.

(10) Patent No.: US 12,296,666 B2
(45) Date of Patent: May 13, 2025

(54) ARRANGEMENT STRUCTURE FOR POWER SUPPLY UNIT AND REAR SEAT IN ELECTRIC VEHICLE (71) Applicant: MITSUBISHI JIDOSHA KOGYO KABUSHIKI KAISHA, Tokyo (JP)

(72) Inventors: Shoji Tanizawa, Tokyo (JP); Yutaka Akatani, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 348 days.

(21) Appl. No.: 17/761,859

(22) PCT Filed: Nov. 9, 2020

(86) PCT No.: PCT/JP2020/041654
§ 371 (c)(1),
(2) Date: Mar. 18, 2022

(87) PCT Pub. No.: WO2021/145058
PCT Pub. Date: Jul. 22, 2021

(65) Prior Publication Data
US 2022/0363121 A1 Nov. 17, 2022

(30) Foreign Application Priority Data

Jan. 17, 2020 (JP) ................................. 2020-006235

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/66* (2019.02); *B60N 2/30* (2013.01); *B62D 21/11* (2013.01); *B60K 2001/0433* (2013.01)

(58) Field of Classification Search
CPC ... B60K 1/04; B60K 2001/0433; B60L 50/66; B60N 2/30; B62D 21/11
See application file for complete search history.

(56) References Cited

U.S. PATENT DOCUMENTS 6,682,120 B2 * 1/2004 Kamida ............... B60N 2/3011
296/65.09
6,994,178 B2 * 2/2006 Mizuno
(Continued)

FOREIGN PATENT DOCUMENTS

JP          4032020 B2      1/2008
JP          2017-88077 A    5/2017
(Continued)

OTHER PUBLICATIONS

International Search Report (PCT/ISA/210) issued in PCT/JP2020/041654 mailed on Jan. 26, 2021.
(Continued)

Primary Examiner — James A Shriver, II
Assistant Examiner — Nicholas R. Kandas
(74) Attorney, Agent, or Firm — BIRCH, STEWART, KOLASCH & BIRCH, LLP (57) ABSTRACT A rear suspension cross member (4) is suspended from and supported by left and right side members (3l, 3r) on a lower side of a floor (2) of a vehicle body, a drive unit (8) including a driving motor (9) is mounted on the rear suspension cross member (4), and a power supply unit (20) including a junction box (21) is mounted on an upper side of the floor (2). A framework member (43) is spanned between brackets (42l, 42r) erected on the left and right side members (3l, 3r) to support a rear part of a seat cushion (39a) of a rear seat (39), the framework member (43) is disposed at a position rearward of the power supply unit (20) and at a position forward of the rear end of the rear suspension cross member
(Continued)

(4) by a dimension (L1), and is used to mitigate input from another vehicle in a rear end collision.

5 Claims, 9 Drawing Sheets

(51) Int. Cl.
 *B60N 2/30* (2006.01)
 *B62D 21/11* (2006.01)

(56) References Cited

U.S. PATENT DOCUMENTS

| | | | | |
|---|---|---|---|---|
| 8,720,636 | B2 * | 5/2014 | Akoum | H01M 50/249 180/68.5 |
| 8,833,850 | B2 * | 9/2014 | Suzuki | B60N 2/4235 297/216.1 |
| 9,150,128 | B2 * | 10/2015 | Morimoto | B60N 2/68 |
| 10,245,955 | B2 * | 4/2019 | Nakayama | |
| 2018/0126835 | A1 | 5/2018 | Saeki | |
| 2018/0162247 | A1 | 6/2018 | Yasuda et al. | |

FOREIGN PATENT DOCUMENTS

| | | |
|---|---|---|
| JP | 2018-1783 A | 1/2018 |
| JP | 2018-75878 A | 5/2018 |
| JP | 2018-94974 A | 6/2018 |
| JP | 2018-94976 A | 6/2018 |
| JP | 2019-151174 A | 9/2019 |

OTHER PUBLICATIONS

Written Opinion (PCT/ISA/237) issued in PCT/JP2020/041654 mailed on Jan. 26, 2021.
International Preliminary Report on Patentability and English translation of the Written Opinion of the International Searching Authority for International Application No. PCT/JP2020/041654, dated Jul. 19, 2022.
Japanese Office Action for corresponding Japanese Application No. 2021-570657, dated Apr. 5, 2023, with English translation.
Chinese Office Action and Search Report for Chinese Application No. 202080065539.9, dated Jan. 12, 2025, with an English translation.

* cited by examiner

ARRANGEMENT STRUCTURE FOR POWER SUPPLY UNIT AND REAR SEAT IN ELECTRIC VEHICLE

TECHNICAL FIELD

The present invention relates to an arrangement structure for a power supply unit and a rear seat in an electric vehicle.

BACKGROUND ART

Electric vehicles are equipped with various power supply units that control power input/output to/from a driving battery. Examples of such a power supply unit include a junction box that connects a driving battery and an electric load such as a driving motor, a charger that charges the driving battery with an external power supply at a charging station or the like, a DC-AC inverter that converts DC power from the driving battery to AC power for allowing home appliances to be used, or an inverter to perform power drive control or regenerative control of the driving motor, and the power supply unit is connected to an electric load such as the driving battery and the driving motor via a power cable.

In the event of a collision by a vehicle, damage to the power supply unit or breakage of a power cable may cause a short circuit, and so an installation position of the power supply unit and a routing path of the power cable are carefully examined and set.

For example, Patent Document 1 discloses a rear-wheel drive electric vehicle with measures against rear end collisions. This electric vehicle supports left and right rear wheels by a rear suspension cross member suspended and supported on a lower side of a floor of a vehicle body and drives the rear wheels by mounting a driving motor with an inverter and a transaxle as a drive unit on the suspension cross member. A junction box, a charger and a DC-AC inverter are disposed as a power supply unit above the drive unit on the lower side of the floor, and each power supply unit, the inverter of the driving motor and a driving battery are connected via a power cable. The power supply unit and the drive unit are disposed inside a contour line of the rear suspension cross member in a plan view. The strong rear suspension cross member is not easily deformed in the event of a rear end collision, and it is thereby possible to prevent damage to the power supply unit and the drive unit.

PRIOR ART DOCUMENT

Patent Document

Patent Document 1: Japanese Patent Application Laid-Open No. 2019-151174

SUMMARY OF THE INVENTION

Problems to Be Solved By the Invention

The technology described in Patent Document 1 is based on a vehicle body structure in which the drive unit and the power supply unit are both disposed on the rear suspension cross member on the lower side of the floor, whereas another vehicle body structure is also widely implemented in which the power supply unit is relocated to the upper side of the floor. Even in such a vehicle body structure, the power supply unit is disposed in the vicinity of a place right above the drive unit, that is, a place where the drive unit is affected by a rear end collision, for example, out of the necessity that the junction box and the inverter of the driving motor should be connected via a power cable. The power supply unit disposed apart upward from the rear suspension cross member via the floor can be hardly protected by the rear suspension cross member, and so conventionally, there has been a demand for effective protective measures.

The present invention has been implemented to solve such problems, and an object of the present invention is to provide an arrangement structure for a power supply unit and a rear seat in an electric vehicle for a rear-wheel drive vehicle body structure in which a power supply unit is disposed on an upper side of a floor of a vehicle body and a rear seat is disposed right above the power supply unit, capable of more reliably protecting the power supply unit and preventing damage in the event of a rear end collision.

Means for Solving the Problems

In order to achieve the above object, an aspect of the present invention is directed to an arrangement structure for a power supply unit and a rear seat in an electric vehicle, including a rear suspension cross member suspended from and supported by a pair of left and right side members extending in a front-rear direction on a lower side of a floor of a vehicle body to support left and right rear wheels via a suspension, a drive unit mounted on the rear suspension cross member on the lower side of the floor, including a driving motor that drives at least the left and right rear wheels, a power supply unit mounted on an upper side of the floor, including a junction box that relays power from at least a driving battery and supplies the power to the driving motor, and a rear seat disposed right above the power supply unit, in which a rear part of a seat cushion of the rear seat is supported by a framework member spanned between brackets provided on the pair of left and right side members respectively on the upper side of the floor and the framework member is preferably disposed at a position rearward of the power supply unit and at a position forward of the rear end of the rear suspension cross member.

According to the arrangement structure for a power supply unit and a rear seat in an electric vehicle configured as described above, the framework member is configured to be a strong structure to support the weight of the rear seat and the weight of a passenger. The rear seat is disposed right above the power supply unit and the rear part of the seat cushion of the rear seat is supported by the framework member. Furthermore, the framework member is located at a position rearward of the power supply unit and at a position forward of the rear end of the rear suspension cross member.

For this reason, in the event of a rear end collision, further invasion by another vehicle that has invaded forward while deforming the rear part of the floor is prevented by the rear end of the rear suspension cross member first, and if the rear end of the rear suspension cross member alone cannot stop the invasion of another vehicle, the framework member in addition to the rear suspension cross member stops the invasion of another vehicle. As a result, the input from another vehicle is mitigated in two stages, and so, it is possible to prevent not only a collision with the power supply unit by another vehicle but also damage to the power supply unit caused by the collision.

As another aspect, the framework member is preferably disposed at a position above the power supply unit.

According to the arrangement structure for a power supply unit and a rear seat in an electric vehicle configured as described above, since the rear end of the rear suspension cross member is disposed on the lower side of the power supply unit and the framework member is disposed on the upper side, another vehicle is allowed to reliably collide with the rear end of the rear suspension cross member or the framework member before colliding with the power supply unit regardless of the height of invasion to thereby mitigate the input. Moreover, since the framework member is located above the power supply unit, even when the invasion by another vehicle causes the framework member to be deformed or moved to the power supply unit side, it is possible to prevent the framework member from interfering with the power supply unit and more reliably protect the power supply unit and prevent damage.

Preferably, as a further aspect, a storage recess is formed on the floor at a position rearward of the rear seat, the seat cushion of the rear seat is supported so as to be rotatable around the framework member, a seatback of the rear seat is supported so as to be rotatable with respect to the seat cushion, and when the seatback is rotated so as to overlap the seat cushion, the seat cushion is allowed to be stored in the storage recess by rotating the entire rear seat rearward around the framework member. Further, the framework member is disposed at a position above the power supply unit.

According to the arrangement structure for a power supply unit and a rear seat in an electric vehicle configured as described above, when the rear seat is stored in the storage recess, another vehicle that has invaded forward while deforming the rear part of the floor by the rear end collision collides with the rear seat in the storage recess first. The behavior of the rear seat differs depending on collision conditions such as a height of invasion from another vehicle, and the rear seat, for example, is crushed in the front-rear direction while keeping its posture, flipped up with rotation around the framework member, or generates both behaviors simultaneously.

When the rear seat is crushed in the front-rear direction, the rear seat is crushed with its forward movement restricted by the strong framework member, the input from another vehicle is absorbed by a urethane material or the like inside, and so the subsequent input when another vehicle collides with the rear end of the rear suspension cross member or the input when another vehicle collides with the framework member is mitigated. On the other hand, when the rear seat is flipped up, since the framework member, the center of rotation, is disposed at a position above the power supply unit, all regions of the rear seat after flipped up are located above the power supply unit, and it is thereby possible to reliably prevent a collision of the rear seat with the power supply unit.

As a further aspect, the arrangement structure preferably further includes a front floor cross member and a rear floor cross member formed on a top surface of the floor and extending in a left-right direction, both left and right ends of which are connected to the pair of left and right side members respectively, and a unit cover, a front edge of which is fixed to the front cross member and a rear edge of which is fixed to the rear floor cross member, to cover the power supply unit from above, and the framework member is preferably disposed at a position rearward of the unit cover.

According to the arrangement structure for a power supply unit and a rear seat in an electric vehicle configured as described above, since the front edge and the rear edge of the unit cover are fixed to the front and rear floor cross members so that their positional displacements are restricted, the strength of the unit cover in the front-rear direction is increased. The input from another vehicle is mitigated by a collision of the rear suspension cross member with the rear end, mitigated by a collision with the framework member and further mitigated by a collision with the cover having high strength in the front-rear direction, making it possible to more reliably prevent a collision with the power supply unit by another vehicle.

As a still further aspect, the rear suspension cross member is suspended from and supported by a total of four fixed points at the front and rear positions of the pair of left and right side members and the brackets are preferably fixed on the pair of left and right side members at positions sandwiching the pair of left and right fixed points rearward of the rear suspension cross member in the front-rear direction.

According to the arrangement structure for a power supply unit and a rear seat in an electric vehicle configured as described above, the left and right side members are connected via the rear suspension cross member on the lower side of the floor, and the brackets on the left and right side members are connected via the framework member on the upper side of the floor. The left and right brackets sandwich the respective side members and overlap the left and right fixed points rearward of the rear suspension cross member in the front-rear direction. As a result, the rear part of the rear suspension cross member, the left and right brackets and the framework member are connected at substantially matching positions in the front-rear direction across the left and right side members, acting in concert to form a strong structure, and so the deformation of the rear suspension cross member and the framework member is further suppressed.

Advantageous Effects of the Invention

According to the arrangement structure for a power supply unit and a rear seat in an electric vehicle of the present invention, in the rear-wheel drive vehicle body structure in which the power supply unit is disposed on the upper side of the floor of the vehicle body and furthermore, the rear seat is disposed right above the power supply unit, it is possible to reliably protect the power supply unit and prevent damage in the event of a rear end collision.

MODE FOR CARRYING OUT THE INVENTION

Hereinafter, an embodiment of an arrangement structure for a power supply unit and a rear seat in an electric vehicle that embodies the present invention will be described.

Figure 1:
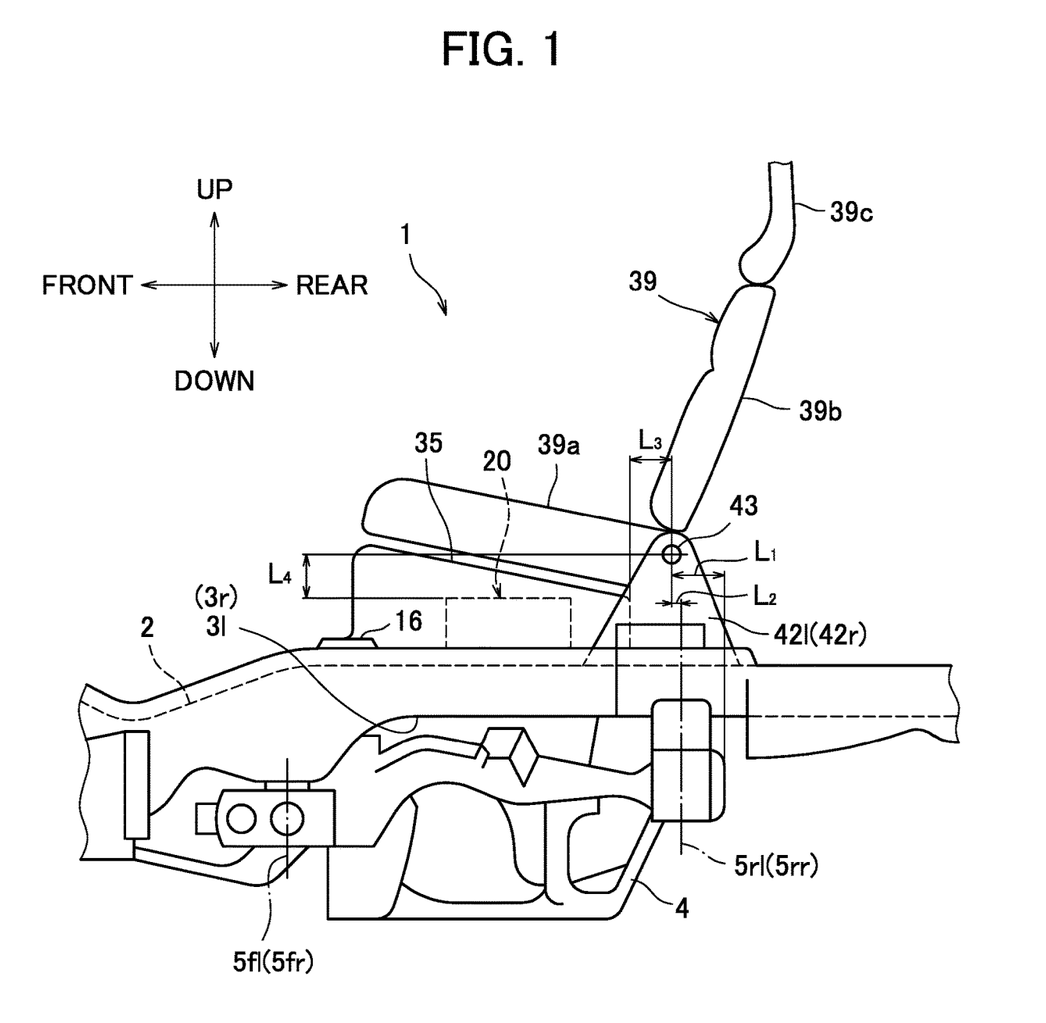
FIG. 1 is a cross-sectional view illustrating a positional relationship between a rear suspension cross member and a rear seat with respect to a side member viewing a rear part of an electric vehicle of an embodiment from a left side.
Figure 2:
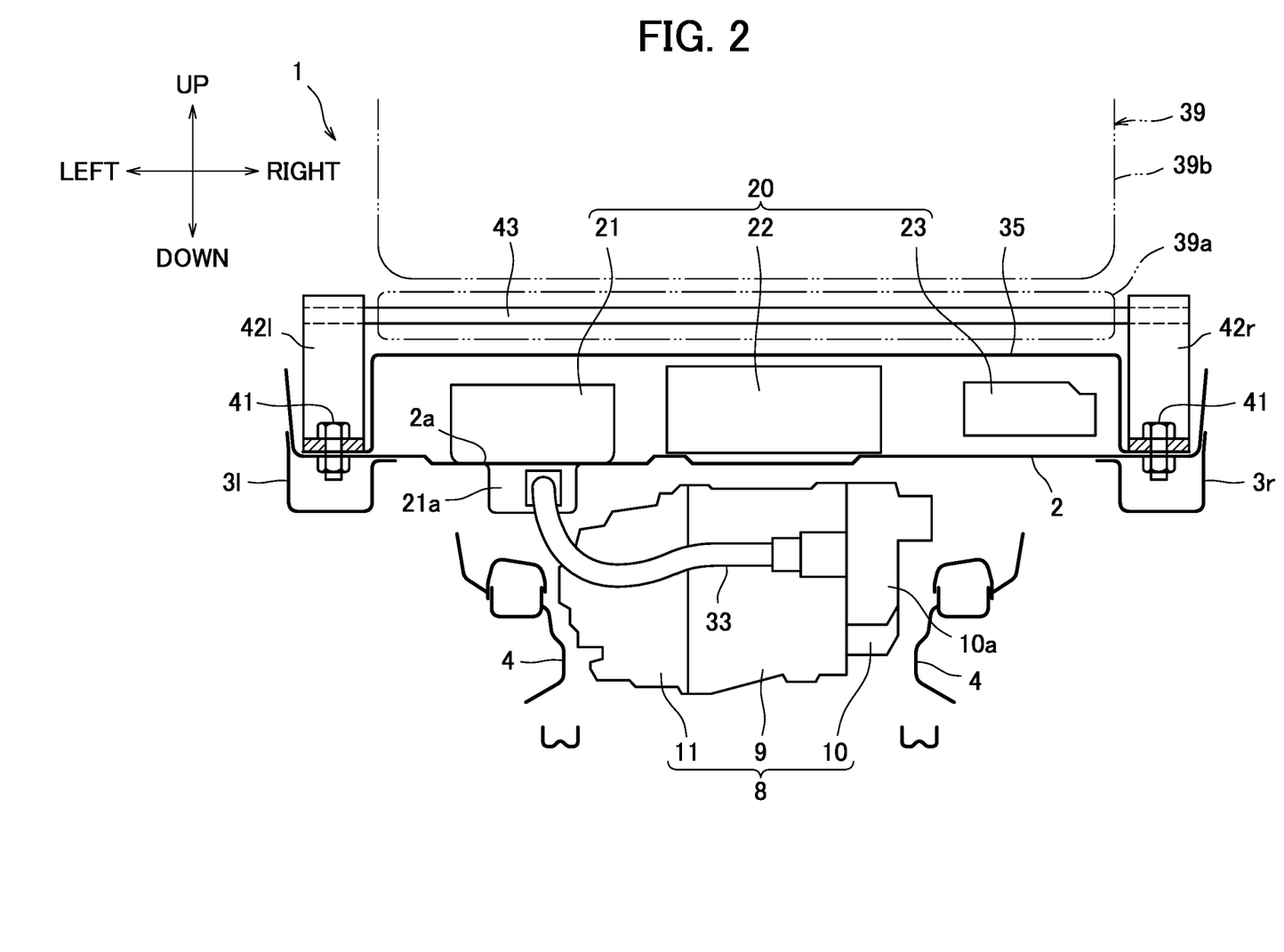
FIG. 2 is a cross-sectional view illustrating a positional relationship between a drive unit and a power supply unit with respect to a floor viewing a rear part of the electric vehicle from behind.
Figure 3:
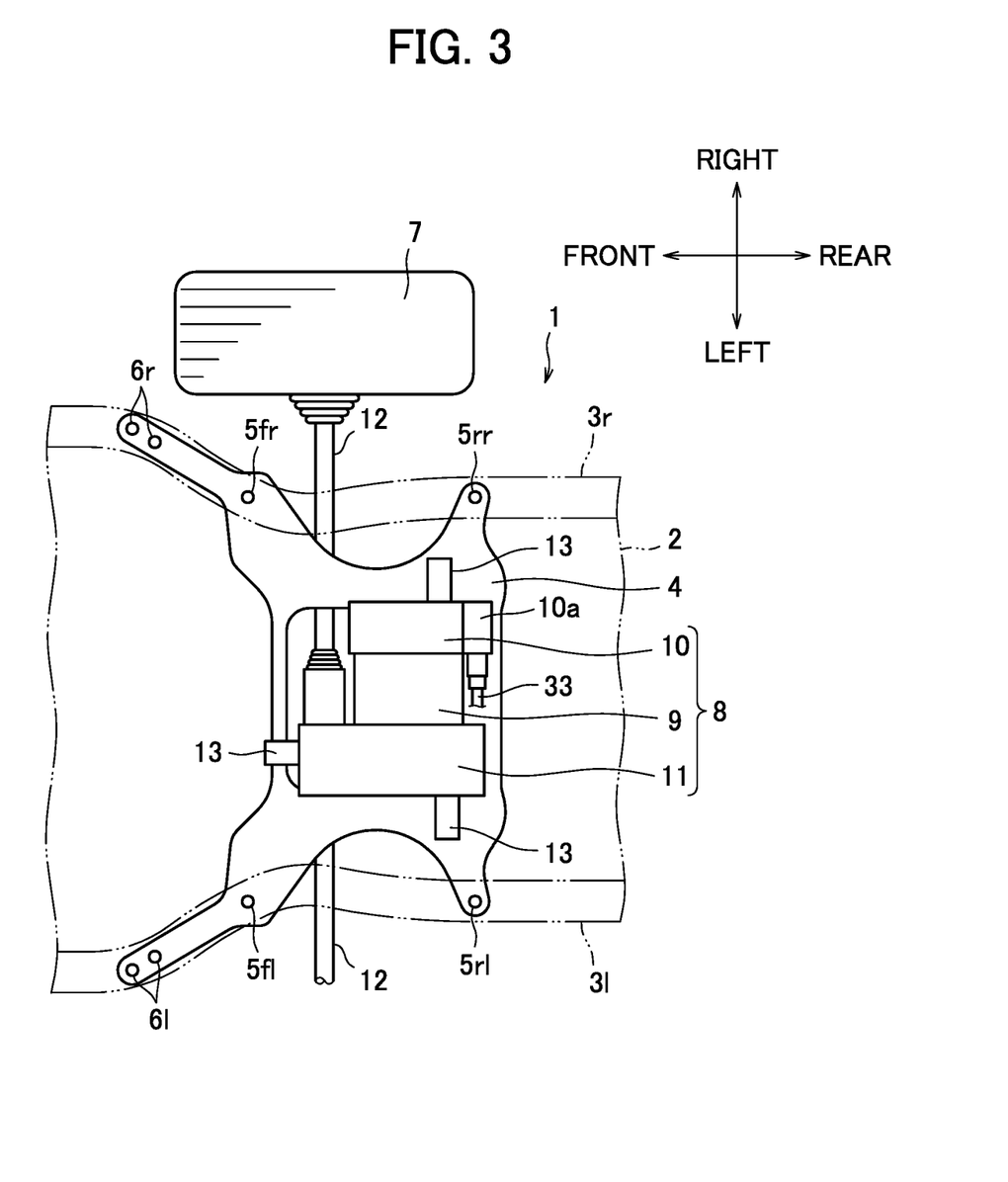
FIG. 3 is a plan view illustrating a state in which the drive unit is disposed on the rear suspension cross member.

FIG. 1 is a cross-sectional view illustrating a positional relationship between a rear suspension cross member and a rear seat with respect to a side member viewing a rear part of an electric vehicle of the present embodiment from a left side, FIG. 2 is a cross-sectional view illustrating a positional relationship between a drive unit and a power supply unit with respect to a floor likewise viewing a rear part of the electric vehicle from behind, and FIG. 3 is a plan view illustrating a state in which the drive unit is disposed on the rear suspension cross member. In the following description, front-rear, left-right and up-down directions will be expressed with the driver in the vehicle as a main subject.

An electric vehicle 1 of the present embodiment is a hybrid vehicle equipped with a driving motor 9, which will be described later, and an engine (not shown), as driving power sources. A pair of left and right side members 3*l* and 3*r* are provided on an undersurface of a floor 2 that constitutes the body of the electric vehicle 1, and each side member 3*l* or 3*r* extends in a front-rear direction while forming a closed cross section with the floor 2.

A rear suspension cross member 4 is disposed on the lower side of the floor 2 and both the left and right sides of the rear suspension cross member 4 are suspended from and supported by the respective side members 3*l* and 3*r*. More specifically, in a plan view shown in FIG. 3, support mounts 5*fl*, 5*fr*, 5*rl* and 5*rr* (corresponding to the fixed points of the present invention, and so, called hereinafter, "fixed points") are provided at front and rear positions of the left and right side members 3*l* and 3*r*, and front left and right, and rear left and right parts of the rear suspension cross member 4 are suspended from and supported by the respective fixed points 5*fl*, 5*fr*, 5*rl* and 5*rr*. Both left and right sides of the rear suspension cross member 4 are extended forward from the fixed points 5*fl* and 5*fr* at the front positions and fastened to the left and right side members 3*l* and 3*r* by a pair of bolts 6*l* and 6*r* respectively.

Left and right rear wheels 7 (only the right side is shown in FIG. 3) are supported by the left side and the right side of the rear suspension cross member 4 via double-wishbone-based suspension (not shown). Since the configuration of the suspension is well known, detailed description will be omitted, but the suspension is constructed of an upper arm, a lower arm, a toe control link, a spring and an absorber or the like. To resist input from the road surface and a drive reaction force on the rear wheels 7 or the like while the hybrid vehicle 1 is running, the rear suspension cross member 4 is manufactured from a thick steel sheet, has high strength and is supported from the left and right side members 3*l* and 3*r* with similarly high strength.

On the lower side of the floor 2, a driving motor 9, an inverter 10 provided integrally with the driving motor 9 and a transaxle 11 that functions as a reduction gear are mounted on the rear suspension cross member 4 as a drive unit 8 via a support mount 13, and left and right rear wheels 7 are connected to the transaxle 11 via a pair of left and right drive shafts 12.

The driving motor 9 is driven and controlled by the inverter 10. For example, during power drive control, DC power from a driving battery (not shown) is converted to three-phase AC power by the inverter 10, supplied to the driving motor 9, and the rotation of the driving motor 9 is decelerated in the transaxle 11 and the left and right rear wheels 7 are driven via the drive shafts 12. On the other hand, during regenerative control, the rotations of the left and right rear wheels 7 are transmitted to the driving motor 9 via the drive shafts 12 and the transaxle 11, and three-phase AC power generated by the driving motor 9 is converted to DC power by the inverter 10 to charge the driving battery.

Figure 4:
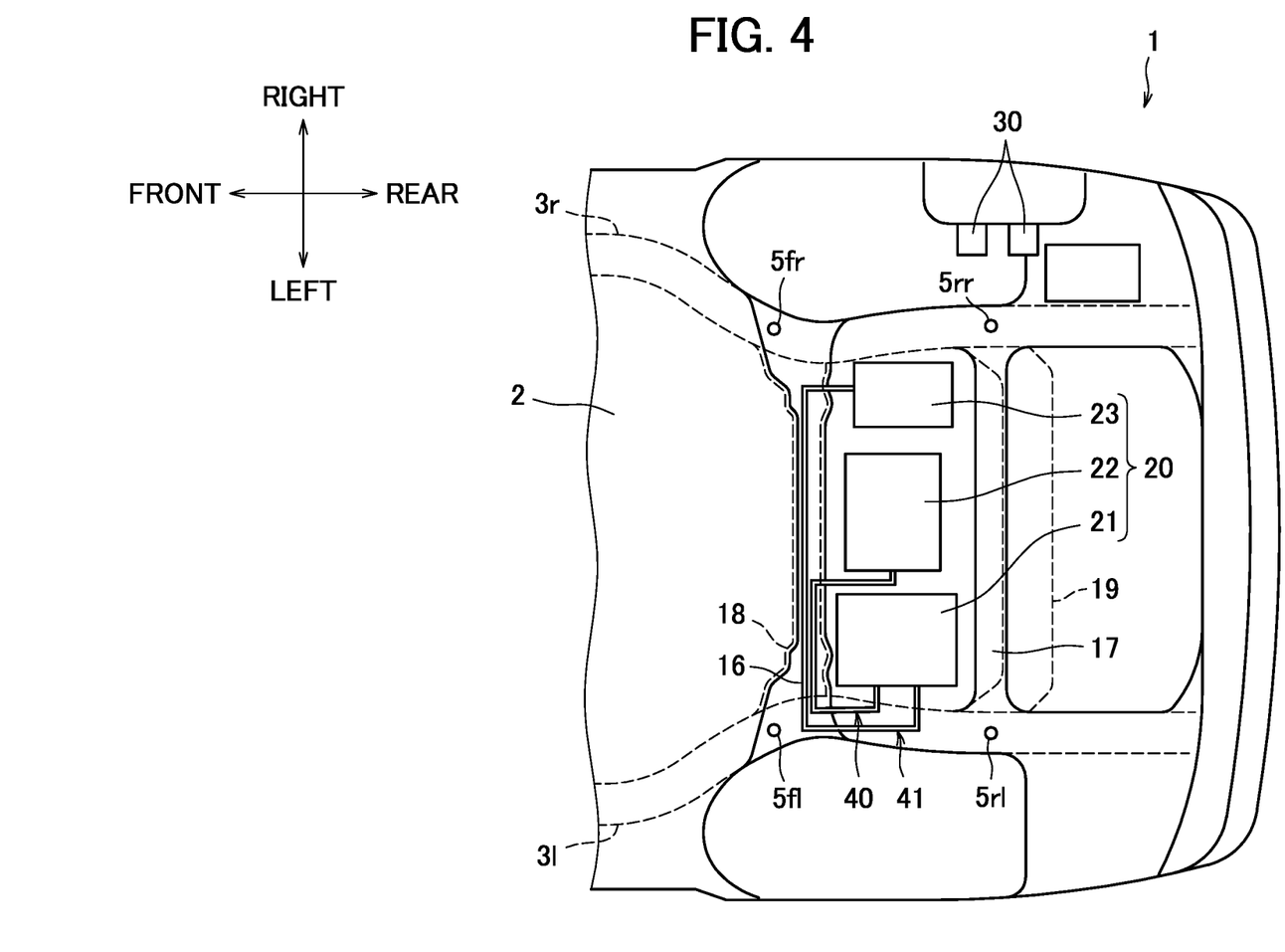
FIG. 4 is a plan view illustrating a state in which the power supply unit is disposed on the floor.
Figure 5:
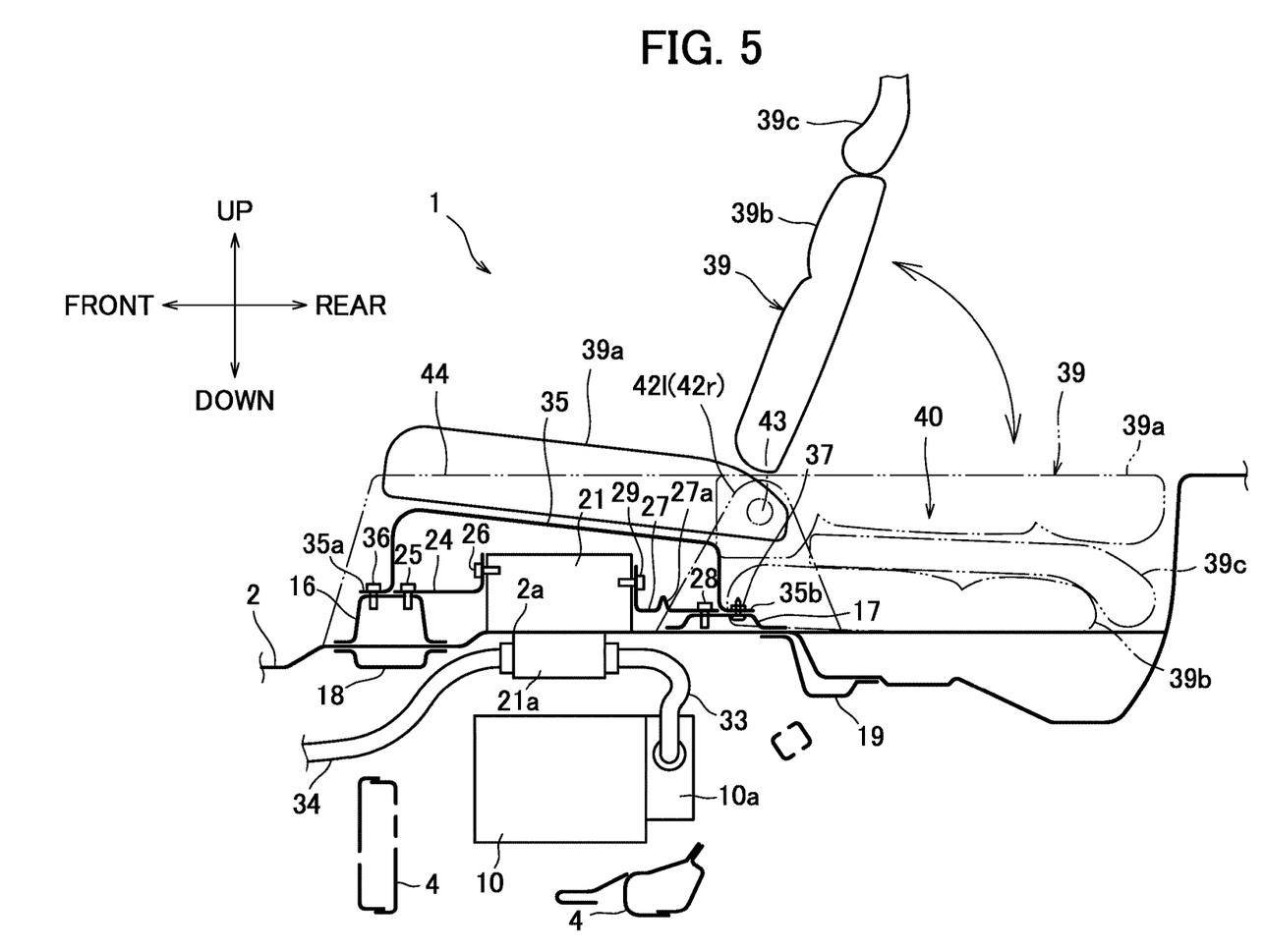
FIG. 5 is a cross-sectional view illustrating a state in which the power supply unit is mounted viewing a rear part of the electric vehicle from a left side.

FIG. 4 is a plan view illustrating a state in which the power supply unit is disposed on the floor 2 and FIG. 5 is a cross-sectional view illustrating a state in which the power supply unit is mounted viewing the rear part of the electric vehicle 1 from the left side.

As shown in FIGS. 4 and 5, upper front and upper rear floor cross members 16 and 17 are provided on the top surface of the floor 2, and lower front and lower rear floor cross members 18 and 19 are provided on the undersurface of the floor 2. The respective floor cross members 16 to 19 are extended in a left-right direction while forming a closed cross section with the undersurface of the floor 2 and both ends thereof are connected to the left and right side members 3*l* and 3*r*.

A junction box 21, a charger 22 and a DC-AC inverter 23 are mounted in order from the left side on the floor 2 as a power supply unit 20. As is generally known, the junction box 21 is a device that connects the driving battery and various electric loads such as the driving motor 9, the charger 22 is a device that charges the driving battery with power from an external power supply at a charging station or the like via charging ports 30, and the DC-AC inverter 23 is a device that converts DC power of the driving battery to AC power of 100 V to enable home appliances.

FIG. 5 illustrates a state in which the junction box 21 is mounted, the front side of the junction box 21 is fixed to the upper front floor cross member 16 by a bracket 24 and bolts 25 and 26, and the rear side of the junction box 21 is fixed to the upper rear floor cross member 17 by a bracket 27 and bolts 28 and 29. A substantially triangular fragile part 27*a* is formed by bending in the bracket 27 so that in the event of a rear end collision by another vehicle, the fragile part 27*a* is bent and deformed to exert impact absorption action. Although overlapping description will be omitted, similar mounting states are also applicable to the charger 22 and the DC-AC inverter 23.

As shown in FIG. 4, a power cable 40 connecting the junction box 21 and the charger 22 on the upper side of the floor 2 and on the front side of the power supply unit 20 is connected to an outer side surface of the junction box 21 in the vehicle and a side surface of the charger 22 on the junction box 21 side, and similarly, a power cable 41 connecting the junction box 21 and the DC-AC inverter 23 is connected to the outer side surface of the junction box 21 in the vehicle and a front side of the DC-AC inverter 23. As shown in FIGS. 2 and 5, a terminal block 21*a* is provided on the undersurface of the junction box 21, fitted into a through hole 2*a* formed in the floor 2 and protruding downward. One end of the motor-side power cable 33 is connected to a rear side of the terminal block 21*a* and the other end is connected to a left side surface of the terminal block 10*a* of the inverter 10.

Although not shown, a driving battery is disposed in front of the rear suspension cross member 4 on the lower side of the floor 2, and the terminal block 21*a* of the junction box 21 is connected to the driving battery via a battery-side power cable 34. Power exchange between the driving battery and the charger 22, the DC-AC inverter 23 and the inverter 10 of the driving motor 9 is performed by relaying the junction box 21. For example, DC power from the driving battery is supplied to the DC-AC inverter 23 via the junction box 21, converted to AC power of 100 V and used to operate home appliances. AC power supplied from an external power supply at a charging station or the like is converted to DC power by the charger 22 to charge the driving battery via the junction box 21. The above-described power drive control and regenerative control on the driving motor 9 are also performed via the junction box 21.

As shown in FIG. 5, a rectangular box-shaped unit cover 35 that opens downward is disposed right above the power supply unit 20. Flange-shaped front edge 35a and rear edge 35b of the unit cover 35 are fixed to the top surfaces of the upper front and upper rear floor cross members 16 and 17 with a bolt 36 and a nut 37, and the power supply unit 20 is covered with the unit cover 35 from above. The unit cover 35 is manufactured by bending a steel sheet and the strength thereof is reinforced by forming many ribs (not shown) extending in the front-rear direction.

Figure 6:
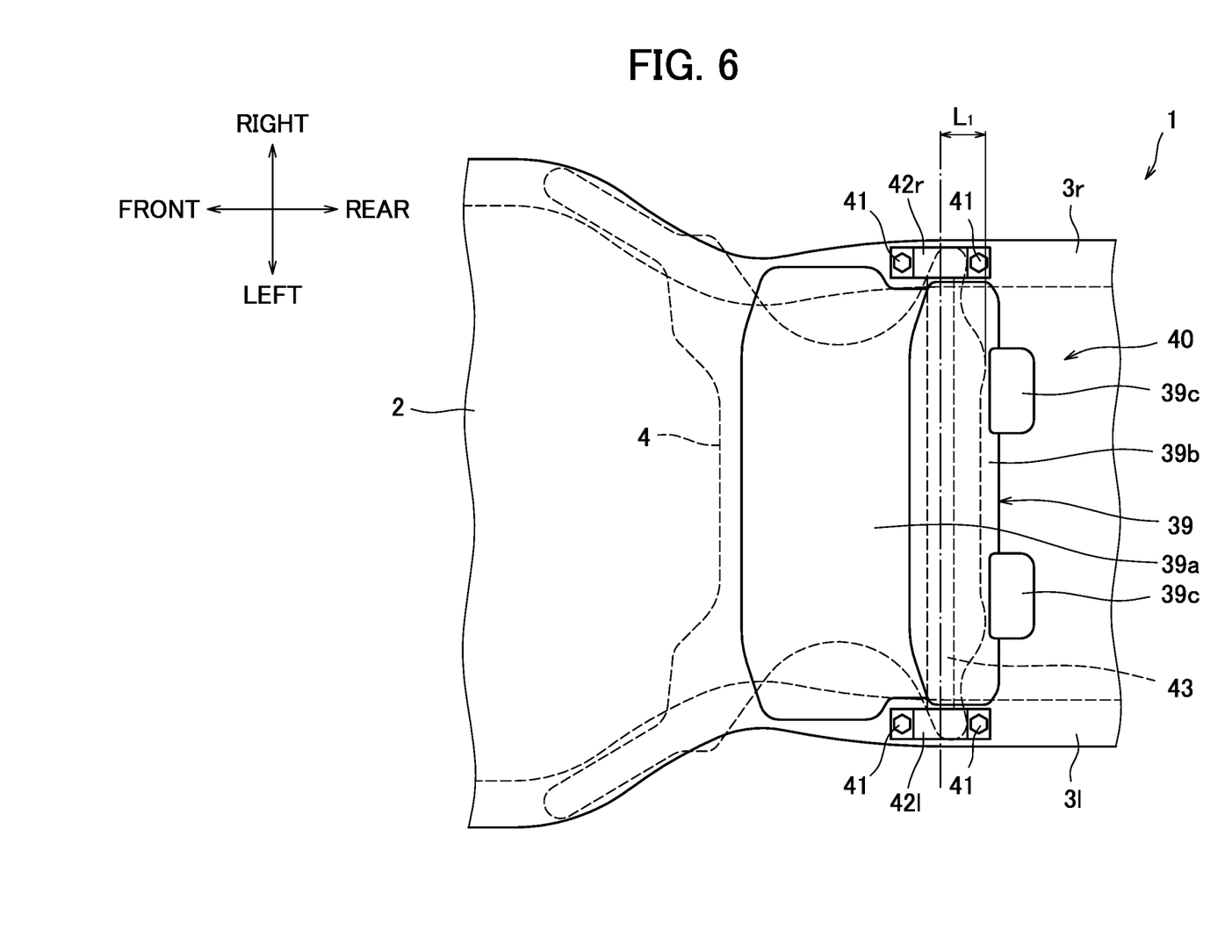
FIG. 6 is a plan view illustrating a state in which the rear seat is disposed on the floor.

FIG. 6 is a plan view illustrating a state in which the rear seat is disposed on the floor.

As shown in FIGS. 1, 2, 5 and 6, a retractable third row seat 39 (corresponding to the rear seat of the present invention, called a "rear seat" in the following description) is disposed right above the unit cover 35, and a storage recess 40 to store a rear seat 39 is formed behind the rear seat 39 on the floor 2. Bases of brackets 42l and 42r, which form a substantially triangular shape in a side view are fixed to the left and right side members 3l and 3r by a pair of bolts 41, and a framework member 43 made of a pipe member is spanned in a left-right direction between vertices of the left and right brackets 42l and 42r, both ends of which are fixed to the brackets 42l and 42r.

As shown in FIG. 1, the framework member 43 is disposed at a position forward of the rear end of the rear suspension cross member 4 by a dimension L1 in the front-rear direction, disposed at a position forward of the rear left and right fixed points 5rl and 5rr by a dimension L2, which is more minute, and disposed at a position rearward of the rear end of the unit cover 35 by a dimension L3. In an up-down direction, the framework member 43 is disposed at a position upward of the highest part of the power supply unit 20 by a dimension L4.

Since the framework member 43 is only the minute dimension L2 apart from the fixed points 5rl and 5rr in the front-rear direction as described above, the left and right brackets 42l and 42r that support the framework member 43 are disposed at positions overlapping the fixed points 5rl and 5rr in the front-rear direction across the left and right side members 3l and 3r.

The framework member 43 disposed in this way supports a rear part (not shown) of a seat cushion 39a of the rear seat 39 in the left-right direction, and thus, the rear part of the rear seat 39 is supported from the side members 3l and 3r via the framework member 43 and left and right brackets 42l and 42r. The front part of the seat cushion 39a is supported by brackets (not shown) on left and right wheelhouse inners via a latch mechanism (not shown) and when the latch mechanism is released, the front part of the seat cushion 39a is separated from the bracket on the wheelhouse inners and can be rotated around the framework member 43. Although not shown, the seatback 39b is rotatably supported by the seat cushion 39a and fixed by a locking mechanism (not shown) at a desired angle. A headrest 39c is connected to a top part of the seatback 39b and this headrest 39c is also rotatable with respect to the seatback.

Such a configuration makes the rear seat 39 foldable around the framework member 43. A storing procedure will be described based on FIG. 5. The headrest 39c is folded forward and overlapping the seatback 39b first, the locking mechanism of the seatback 39b is then released, the seatback 39b is folded forward and overlapping the seat cushion 39a. In this way, the rear seat 39 is folded in three layers, the latch mechanism of the seat cushion 39a is released and the entire rear seat 39 is caused to rotate backward around the framework member 43. As shown by two-dot dashed lines in FIG. 5, the rear seat 39 is stored in the storage recess 40 on the floor 2 and the bottom surface of the seat cushion 39a becomes flush with a luggage room board surface 44. The reverse of the above-described procedure is taken to unfold the folded rear seat 39 so that the rear seat 39 can be used again.

The framework member 43 is required to be strong enough to support the weight of the rear seat 39 and the weights of passengers, and accurately fold and unfold the rear seat 39, and the left and right brackets 42l and 42r that support the rear seat 39 are also required to be strong enough. In order to meet such requirements, not only the framework member 43, and brackets 42l and 42r are made of a thick raw material, but also the brackets 42l and 42r over the left and right side members that function as the structure of the vehicle body are erected. Thus, the framework member 43 is originally constructed as a strong structure, and according to the present embodiment, positions in the front-rear direction and in the up-down direction are set as described based on FIG. 1 in order to use the framework member 43 to protect the power supply unit 20 in the event of a rear end collision, and protective action for the power supply unit 20 in the event of a rear end collision will be described hereinafter.

Since the rear seat 39 is disposed right above the power supply unit 20 and the rear part of the seat cushion 39a of the rear seat 39 is supported by the framework member 43, the framework member 43 is located behind the power supply unit 20. Moreover, since the rear end of the rear suspension cross member 4 is located behind the framework member 43 by the dimension L1, in the event of a rear end collision, another vehicle that has invaded forward while deforming the rear part of the floor 2 collides with the rear end of the rear suspension cross member 4 first. Since the rear suspension cross member 4 itself has high strength and is suspended from and supported by the left and right side members 3l and 3r likewise having high strength, the deformation of the rear suspension cross member 4 is suppressed and input from another vehicle is mitigated. A violent rear end collision may cause another vehicle to invade forward further to collide with the framework member 43. However, with the framework member 43 that functions as the above-described strong structure, forward deformation, for example, forward bending deformation, is suppressed to minimum and the input from another vehicle is thereby further mitigated.

Thus, when the invasion of another vehicle is blocked first by the rear end of the rear suspension cross member 4 apart rearward from the rear seat 39, if the rear end of the rear suspension cross member 4 alone cannot block the invasion of another vehicle, the invasion of another vehicle is blocked by the framework member 43 in addition to the rear suspension cross member 4, and as a result, the input from another vehicle is mitigated in two stages.

More specifically, when another vehicle collides with the rear suspension cross member 4, absorption of the input is started with the deformation of the rear suspension cross member 4 from this point in time, and another vehicle approaches the framework member 43 while deforming the rear suspension cross member 4. In the meanwhile, the input is continuously absorbed by deforming the rear suspension cross member 4, and so, in many cases, the input remaining at the time of a collision with the framework member 43, in other words, the input to be absorbed for protection of the power supply unit 20 is reduced sufficiently. After the collision with the framework member 43, deformation of the framework member 43 also starts in addition to the deformation of the rear suspension cross member 4, making it sure to absorb the remaining input. Therefore, it is possible to prevent a collision of another vehicle with the power supply unit 20, and eventually damage to the power supply unit 20 caused by the collision.

Naturally, the passenger seated in the rear seat 39, as in the case of the power supply unit 20, can also be reliably protected from a rear end collision by mitigating the input in two stages, that is, the rear end of the rear suspension cross member 4 and the framework member 43.

Particularly, in the present embodiment, the left and right brackets 42*l* and 42*r* that support the framework member 43 are disposed at overlapping positions in the front-rear direction with respect to the respective fixed points 5*rl* and 5*rr* across the left and right side members 3*l* and 3*r*. Moreover, on the lower side of the floor, the left and right side members 3*l* and 3*r* are connected via the rear suspension cross member 4, and on the upper side of the floor, the brackets 42*l* and 42*r* on the right side members 3*l* and 3*r* are connected via the framework member 43. For this reason, the rear part of the rear suspension cross member 4 (locations of the fixed points 5*rl* and 5*rr*), the left and right brackets 42*l* and 42*r*, and the framework member 43 are connected at substantially matching positions in the front-rear direction across the left and right side members 3*l* and 3*r*, acting in concert to form a strong structure. This factor also significantly contributes to suppressing deformation of the rear suspension cross member 4 and the framework member 43 in the event of a rear end collision, and eventually protection of the power supply unit 20.

The framework member 43 is disposed above a highest point of the power supply unit 20 by a dimension L4. As a result, the rear end of the rear suspension cross member 4 is disposed below the power supply unit 20 and the framework member 43 is disposed at a position above the power supply unit 20. For example, when the framework member 43 is disposed below the highest point of the power supply unit 20, if the height of invasion of another vehicle is high, another vehicle collides with neither the rear end of the rear suspension cross member 4 nor the framework member 43 from the front, another vehicle is more likely to collide with the power supply unit 20 without mitigating the input so much. By disposing the framework member 43 and the rear suspension cross member 4 above and below the power supply unit 20 respectively, it is possible to cause another vehicle to reliably collide with the rear suspension cross member 4 and the framework member 43 regardless of the height of invasion and mitigate the input before colliding with the power supply unit 20 and this factor also significantly contributes to protection of the power supply unit 20.

Furthermore, since the framework member 43 is disposed at a position above the power supply unit 20, even when the framework member 43 is deformed or moved to the power supply unit 20 side due to invasion of another vehicle, it is possible to prevent the framework member 43 from interfering with the power supply unit 20 and more reliably protect the power supply unit 20 and prevent damage.

On the other hand, the front edge 35*a* and the rear edge 35*b* of the unit cover 35 that covers the power supply unit 20 from above are fixed to the top surfaces of the upper front and upper rear floor cross members 16 and 17, both ends of which are connected to the left and right side members 3*l* and 3*r*. As a result, since the front edge 35*a* and the rear edge 35*b* of the unit cover 35 are fixed to the strong upper front and upper rear floor cross members 16 and 17, and their positional displacements are restricted, the strength of the unit cover 35 in the front-rear direction is increased in combination with the formation of many ribs.

The framework member 43 is disposed at a position rearward of the rear end of the unit cover 35 by the dimension L3. Therefore, the input from another vehicle is mitigated by a collision with the rear end of the rear suspension cross member 4, mitigated by a collision with the framework member 43, and further mitigated by a collision with the unit cover 35 having high strength in the front-rear direction, and so it is possible to more reliably prevent a collision with the power supply unit 20 by another vehicle.

Furthermore, disposing the framework member 43 at a position upward based on the dimension L4 exerts a protective function of the power supply unit 20 even in the event of a rear end collision while the rear seat 39 is stored.

Figure 7:
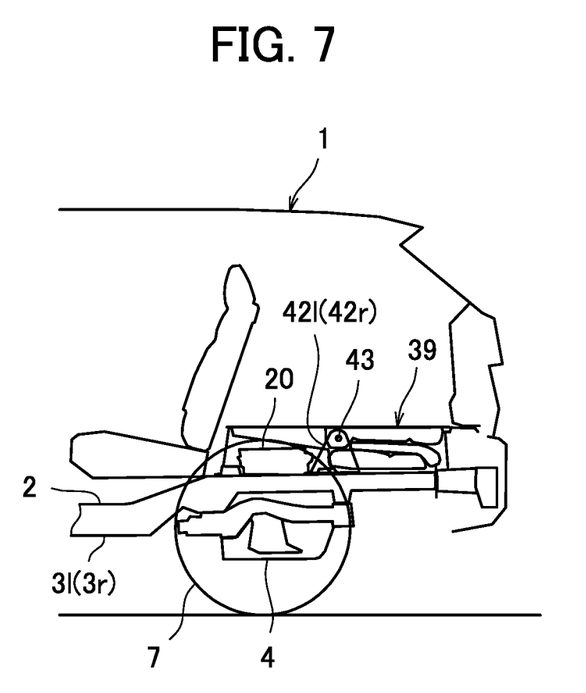
FIG. 7 is a schematic view illustrating a state in which the rear seat is stored.
Figure 8:
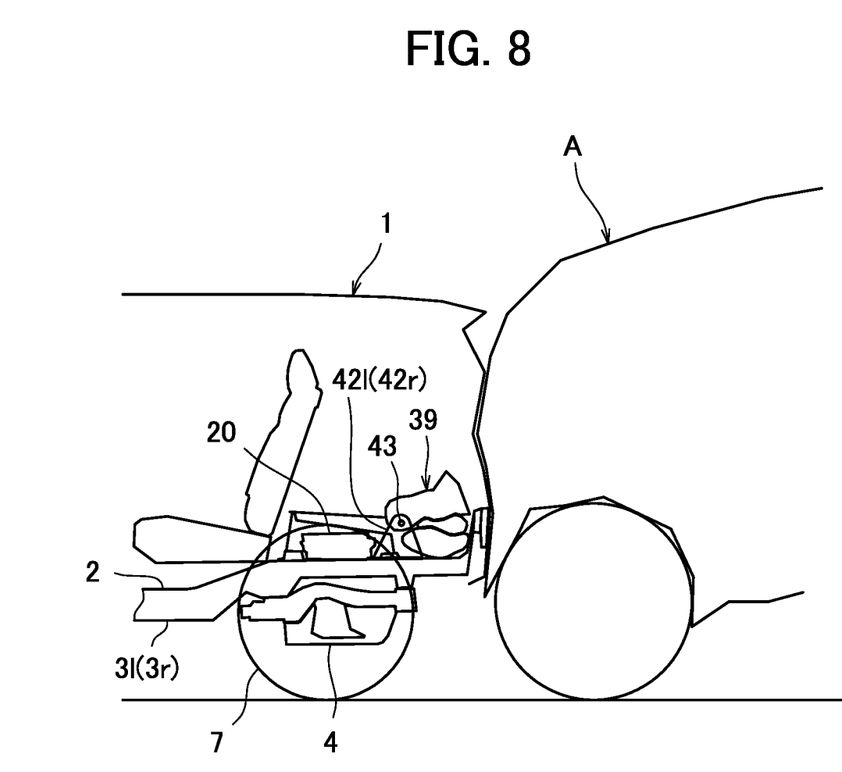
FIG. 8 is a schematic view illustrating the behavior of the rear seat in the event of a rear end collision by another vehicle with a relatively high vehicle height.
Figure 9:
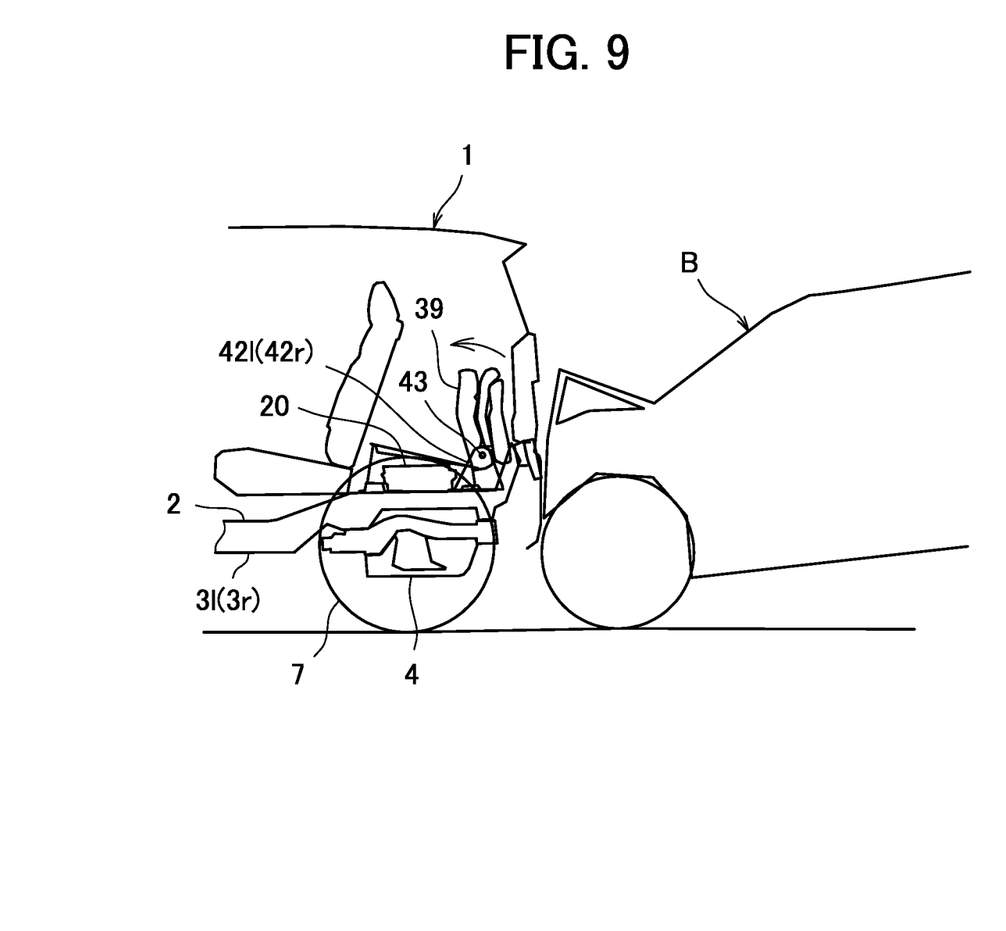
FIG. 9 is a schematic view illustrating the behavior of a rear seat in the event of a rear end collision by another vehicle with a relatively low vehicle height.

FIG. 7 is a schematic view illustrating a state in which the rear seat 39 is stored, FIG. 8 is a schematic view illustrating the behavior of the rear seat 39 in the event of a rear end collision by another vehicle A with a relatively high vehicle height and FIG. 9 is a schematic view illustrating the behavior of the rear seat 39 in the event of a rear end collision by another vehicle B with a relatively low vehicle height.

While the rear seat 39 is stored, another vehicle that has invaded forward while deforming the rear part of the floor 2 by a rear end collision collides with the rear seat 39 in the storage recess 40 prior to the rear end of the rear suspension cross member 4 first. The behavior (deformation, movement or the like) of the rear seat 39 at this time differs depending on collision conditions such as the height of invasion of another vehicle. In the case of another vehicle A with a high vehicle height such as a bus, since its height of invasion is high, another vehicle is more likely to collide with the rear seat 39 from the front. Forward movement of the rear seat 39 at this time is restricted by the strong framework member 43, and so the rear seat 39 is crushed in the front-rear direction from a normal storage condition shown in FIG. 7 while keeping the posture in the storage recess 40 as shown in FIG. 8. Along with the crushing, the input from another vehicle A is absorbed by the urethane material or the like inside the rear seat 39. Therefore, the input at the time of a collision of another vehicle A with the rear end of the rear suspension cross member 4 or the input at the time of a collision with the framework member 43 is mitigated, and so this factor also significantly contributes to protection of the power supply unit 20.

For example, in the case of another vehicle B with a low vehicle height such as an automobile, since its height of invasion is low, another vehicle is more likely to collide with a position lower than the rear seat 39 while lifting the rear part of the floor 2. The rear seat 39 at this time can be flipped up with rotation around the framework member 43 due to the collision of another vehicle B as shown in FIG. 9 from the normal storage condition shown in FIG. 7. Since the framework member 43, which is the center of rotation, is disposed at a position upward of the power supply unit 20 by the dimension L4, all the regions of the rear seat 39 after flipped up are located above the power supply unit 20. As a result, collisions of the rear seat 39 with the power supply unit 20 are reliably prevented and this factor also significantly contributes to protection of the power supply unit 20.

Note that the behavior of the rear seat 39 in the event of a rear end collision may not always appear clearly as crushing or flipped up, and, for example, when both of the behaviors of crushing and flipped up occur simultaneously, the respective actions and effects can be exerted together.

Although this completes the description of the embodiment, the aspects of the present invention are not limited to the present embodiment. For example, in the above-described embodiment, the present invention has been embodied as an arrangement structure for the power supply unit 20 and the rear seat 39 in the hybrid vehicle 1, whereas the present invention can be arbitrarily changed for any electric vehicle provided with the power supply unit 20 and the rear seat 39, and the present invention may be applicable to an electric automobile equipped with a motor as a driving power source.

In the above-described embodiment, although the driving motor 9, the inverter 10 and the transaxle 11 are disposed on the rear suspension cross member 4 as the drive unit, and the junction box 21, the charger 22 and the DC-AC inverter 23 are disposed on the upper side of the floor 2 as the power supply unit 20, the types and arrangements thereof are not limited to them. For example, an array of the driving motor 9, the inverter 10 and the transaxle 11 may be changed or the inverter 10 may be disposed above the floor 2 as one of the power supply unit 20.

In the above-described embodiment, the rear seat 39 is constructed as the retractable third row seat, but the present invention is not limited to this, and it can be a fixed rear seat without any storage function and in the case of an electric vehicle not equipped with the third row seat, a second row seat may be provided as the rear seat.

EXPLANATION OF REFERENCE SIGNS 1 electric vehicle
2 floor
3*l*, 3*r* side member
4 rear suspension cross member
5*fl*, 5*fr*, 5*rl*, 5*rr* fixed point
7 rear wheel
8 drive unit
9 driving motor
16 upper front floor cross member
17 upper rear floor cross member
20 power supply unit
21 junction box
35 unit cover
35*a* front edge
35*b* rear edge
39 rear seat
40 storage recess
42*l*, 42*r* bracket
43 framework member

The invention claimed is:

1. An arrangement structure for a power supply unit and a rear seat in an electric vehicle, comprising:
a pair of left and right side members extending in a front-rear direction on a lower side of a floor of a vehicle body;
a rear suspension cross member suspended downward from and supported by the pair of left and right and side members to support left and right rear wheels via a suspension;
a drive unit mounted on the rear suspension cross member on the lower side of the floor, comprising a driving motor that drives at least the left and right rear wheels;
a power supply unit mounted on an upper side of the floor, comprising a junction box that relays power from at least a driving battery and supplies the power to the driving motor; and
a rear seat disposed right above the power supply unit; and
a framework member supporting a rear part of a seat cushion of the rear seat and spanned between brackets provided on the pair of left and right side members on the upper side of the floor, wherein
the framework member is disposed at a position rearward of the power supply unit and at a position forward of the rear end of the rear suspension cross member.

2. The arrangement structure for a power supply unit and a rear seat in an electric vehicle according to claim 1, wherein the framework member is disposed at a position above the power supply unit.

3. The arrangement structure for a power supply unit and a rear seat in an electric vehicle according to claim 1, wherein
a storage recess is formed on the floor at a position rearward of the rear seat,
the seat cushion of the rear seat is supported so as to be rotatable around the framework member,
a seatback of the rear seat is supported so as to be rotatable with respect to the seat cushion, and
when the seatback is rotated so as to overlap the seat cushion, the seat cushion is allowed to be stored in the storage recess by rotating the entire rear seat rearward around the framework member, and
the framework member is disposed at a position above the power supply unit.

4. The arrangement structure for a power supply unit and a rear seat in an electric vehicle according to claim 1, further comprising:
a front floor cross member and a rear floor cross member formed on a top surface of the floor and extending in a left-right direction, both left and right ends of which are connected to the pair of left and right side members respectively; and
a unit cover, a front edge of which is fixed to the front cross member and a rear edge of which is fixed to the rear floor cross member, to cover the power supply unit from above, wherein
the framework member is disposed at a position rearward of the unit cover.

5. The arrangement structure for a power supply unit and a rear seat in an electric vehicle according to claim 1, wherein
the rear suspension cross member is suspended from and supported by a total of four fixed points at positions forward and rearward of the pair of left and right side members, and
the brackets are overlapped in the front-rear direction across the pair of left and right side members with respect to a pair of left and right fixed points at positions rearward of the rear suspension cross member respectively.

* * * * *